(12) United States Patent
Raman

(10) Patent No.: US 11,627,457 B2
(45) Date of Patent: Apr. 11, 2023

(54) FACILITATION OF SMART COMMUNICATIONS HUB TO SUPPORT UNMANNED AIRCRAFT FOR 5G OR OTHER NEXT GENERATION NETWORK

(71) Applicant: AT&T Intellectual Property I, L.P., Atlanta, GA (US)

(72) Inventor: Kaveri Raman, Matawan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 209 days.

(21) Appl. No.: 17/207,229

(22) Filed: Mar. 19, 2021

(65) Prior Publication Data

US 2022/0303760 A1    Sep. 22, 2022

(51) Int. Cl.
| | |
|---|---|
| *H04W 48/18* | (2009.01) |
| *H04W 8/24* | (2009.01) |
| *H04W 72/0453* | (2023.01) |
| *H04W 12/06* | (2021.01) |
| *H04W 76/16* | (2018.01) |
| *H04W 12/80* | (2021.01) |

(52) U.S. Cl.
CPC ............ *H04W 8/24* (2013.01); *H04W 12/06* (2013.01); *H04W 12/80* (2021.01); *H04W 72/0453* (2013.01); *H04W 76/16* (2018.02)

(58) Field of Classification Search
CPC ............ B64C 39/024; B64C 2201/027; G08G 5/0069; G08G 5/006; G08G 5/0078; G05D 1/0607; G05D 1/0808; G05D 1/104; G05D 1/1064; H04B 17/318; H04W 76/10; H04W 76/15; H04W 84/06; H04W 36/0085; H04W 4/029; H04W 68/005; H04W 12/64; H04W 12/37; H04W 24/04; H04W 4/021; H04W 64/00; H04W 64/006; H04W 48/00; Y10S 707/913

See application file for complete search history.

(56) References Cited

U.S. PATENT DOCUMENTS

| | | | |
|---|---|---|---|
| 10,726,640 B2 | 7/2020 | Raman | |
| 2019/0212724 A1* | 7/2019 | Phuyal | ................ B64C 39/024 |
| 2021/0204207 A1* | 7/2021 | Fiorese | ................ H04W 12/08 |

OTHER PUBLICATIONS

"Network Slicing for 5G Networks & Services" 5G Americas White Paper, Nov. 2016, 35 pages.
"Utilising Mobile Connectivity for Drones Remote Identification", GSMA, IoT WebTalk, Jul. 15, 2020, 31 pages.
(Continued)

*Primary Examiner* — Gary Lafontant
(74) *Attorney, Agent, or Firm* — Amin, Turocy & Watson, LLP

(57) ABSTRACT

Unmanned aircraft systems (UASs) can be supported by a smart communications hub. Network slices can be utilized to provide services to a UAS that has provided its remote identification number to a network node. After the UAS has been authenticated, by an authentication network slice, based on policies hosted at a service capabilities exposure function (SCEF), the UAS can utilize services provided by other network slices. Additionally, or alternatively, a user equipment associated with the UAS can be provided with suggested services hosted on other slices to which the UAS has not been previously subscribed.

20 Claims, 10 Drawing Sheets

(56) References Cited

OTHER PUBLICATIONS

"Unmanned Aircraft System (UAS) Traffic Management (UTM) Concept of Operations v2.0: Foundational Principles, Roles and Responsibilities, Scenarios and Operational Threads", Federal Aviation Administration Office of NextGen, Mar. 2, 2020, 80 pages.
"Unmanned Aircraft Remote Identification Through Cellular Networks" GSMA, 2020, 31 pages.

* cited by examiner

FACILITATION OF SMART COMMUNICATIONS HUB TO SUPPORT UNMANNED AIRCRAFT FOR 5G OR OTHER NEXT GENERATION NETWORK

TECHNICAL FIELD

This disclosure relates generally to facilitating a smart communications hub. For example, this disclosure relates to facilitating a smart communications hub to support unmanned aircraft for a 5G, or other next generation network, air interface.

BACKGROUND $5^{th}$ generation (5G) wireless systems represent a next major phase of mobile telecommunications standards beyond the current telecommunications standards of $4^{th}$ generation (4G). 5G networks can support higher capacity than current 4G networks, allowing a higher number of mobile broadband users per area unit, and allowing consumption of higher data quantities. This enables a large portion of the population to stream high-definition media many hours per day with their mobile devices, when out of reach of wireless fidelity hotspots. 5G also provides improved support of machine-to-machine communication, also known as the Internet of things, enabling lower cost, lower battery consumption, and lower latency than 4G equipment.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
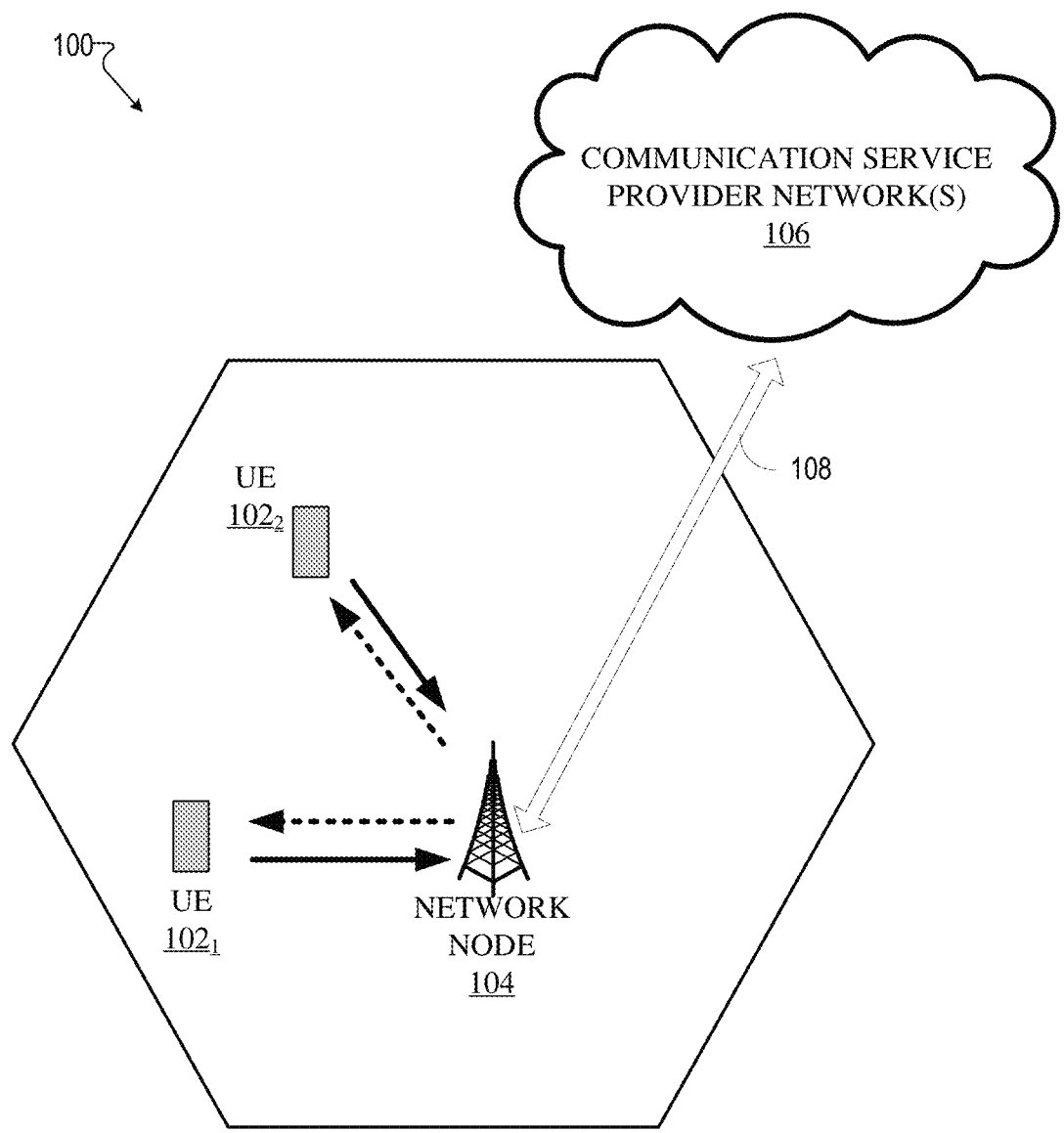
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate smart communications hub to support unmanned aircraft for a 5G air interface or air interface for other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It is noted that although various aspects and embodiments have been described herein in the context of 5G, or other next generation networks, the disclosed aspects are not limited to 5G, and/or other network implementations, as the techniques can also be applied, e.g., in 3G, or 4G systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

As mentioned, described herein are systems, methods, articles of manufacture, and other embodiments or implementations that can facilitate a smart communications hub to support unmanned aircraft for a network such as a 5G network. Facilitating a smart communications hub to support unmanned aircraft for a 5G network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term user equipment (UE) is used. The embodiments are applicable to single carrier, multicarrier (MC), or carrier aggregation (CA) operation(s) of the UE. The term carrier aggregation (CA) is also referred to in connection with (e.g., interchangeably referenced as) a "multi-carrier system", a "multi-cell operation", a "multi-carrier operation", "multi-carrier" transmission and/or "multi-carrier" reception. Note that some embodiments are also applicable for Multi RAB (radio bearers) on some carriers (that is data plus speech is simultaneously scheduled).

In some embodiments, the non-limiting term radio network node, or simply network node, is used. It can refer to any type of network node that serves a UE or network equipment connected to other network nodes, network elements, or any radio node from where a UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second offered simultaneously or concurrently to tens of workers on the same office floor; several hundreds of thousands of simultaneous or concurrent connections for massive sensor deployments; enhanced spectral efficiency compared to 4G or LTE; improved coverage compared to 4G or LTE; enhanced signaling efficiency compared to 4G or LTE; and reduced latency compared to 4G or LTE. In multicarrier systems, such as orthogonal frequency division multiplexing (OFDM), each subcarrier can occupy bandwidth (e.g., subcarrier spacing). If carriers use the same bandwidth spacing, then the bandwidth spacing can be considered a single numerology. However, if the carriers occupy different bandwidth and/or spacing, then the bandwidth spacing can be considered a multiple numerology.

The disclosure describes network slices that can be utilized for unmanned aircraft systems (UAS) that operate below 400 feet. The network slices can be virtual or a part of a software-defined network. A first slice can be set up for registration. When the UAS broadcasts a signal, an entity can register the broadcasted identification with a services hub that can provide services to the UAS. Once authenticated, various network slices can be created to facilitate various services to the UAS. For example, a network slice can be set up for video or IoT such that a trigger condition triggers one of the slices to provide resources to the UAS.

For example, a smart city can subscribe to a network slice that has a video feed. FirstNet services can use this implementation as well as IOT device manufacturers. IOT device manufacturers that want to collect data, e.g., on how a part that they have provided for the drone is functioning, can subscribe to the IOT slice and receive a direct feed on that data.

A remote identifier (ID) of a drone can be broadcast to a network device. When the network has the remote ID, the system can check to see if the drone has subscribed to specific services based on service provider terms and conditions. When an entity controlling the drone has agreed to the terms and conditions, the drone can be registered via the smart hub. A service capability exposure function (SCEF) can expose services under certain conditions. For example, once the drone is registered, the SCEF can make available the services. Based on to what services the entity has subscribed, when the drone is active, a specific service can be allocated to the drone. Consequently, the services to which the drone is subscribed is part of determining to which slices the drone has access.

Alerts can be sent based on a defined set of criteria. For instance, if there is an indication that a threshold number of people have gathered, an alert can be sent to a smart city communications hub. The smart city communications hub can then request a video, via the video slice, of the affected area to provide insights as to what is occurring. The request for this video can terminate at a UAS that can provide a video of the area.

Specific slices can be allocated to a UAS based on the services to which the UAS has been subscribed. Certain triggers can also instantiate certain slices. For example, if a drone (e.g., UAS) is subscribed to a video slice and the drone gathers data, via IOT sensors associated with an IOT slice, indicative of an event, the system can instantiate a slice for video capabilities such that the drone can take video of the event that is occurring. Alternatively, if the drone is not subscribed to a video service, then upon the indication of the event, the system can send an alert to an entity associated with the drone, prompting the entity to subscribe to a video-based service. If the entity (e.g., UE) accepts the prompt, then the video slice can be instantiated, which can allow the drone to take/stream video of the event to the UE. Alerts can also be sent from the network to $3^{rd}$ party devices based on the location of the drone. For example, if a drone's video captured an event occurring that requires police activity, then an alert can go to the nearest police device that is subscribed to the service. Other policies can also be used. For example, the policy could state that the alert is to go to a second and/or third closest police device, relative to the drone, instead of the police device that is closest to the drone, or according to a function of other characteristics of devices relative to the event.

Initially, slice A can capture the drone's remote ID and authenticate that the drone is subscribed to a service when the drone is being utilized (e.g., up in the air). Once the remote ID is captured, the system can utilize a network control plane function to check against policies to determine authentication parameters and/or what services the drone will have access to. After the drone has been authenticated, the SCEF can release other functions to the drone (e.g., a voice feed, alerts to smart cities, video data stream, gathering of IoT data, sending notices to law enforcement, and/or the like) based on services to which the drone has subscribed. Once the SCEF has determined which service shall be released to the drone, the user plane function can instantiate the appropriate slices that correspond to those services.

According to another embodiment, a method can comprise receiving, by network equipment comprising a processor from a base station, signal data, representative of a signal from an unmanned aircraft via a first network slice. In response to receiving the signal data, the method can comprise determining, by the network equipment, that the unmanned aircraft is associated with a subscriber account. In response to determining that the unmanned aircraft is associated with the subscriber account, the method can comprise instantiating, by the network equipment, a capability of the unmanned aircraft via a second network slice. Furthermore, based on the capability, the method can comprise sending, by the network equipment to the base station, provisioning data to provision the unmanned aircraft to utilize the capability via the second network slice.

According to another embodiment, a system can facilitate receiving signal data, representative of a signal, from an unmanned aircraft via a first network slice. In response to receiving the signal data, the system can comprise authenticating the unmanned aircraft based on the unmanned aircraft being determined to be associated with a subscriber account. Furthermore, in response to determining that the unmanned aircraft is associated with the subscriber account and based on an access permitted for the subscriber account, the system can comprise determining a capability to be utilized by the unmanned aircraft via a second network slice that is different from the first network slice. Additionally, in response to determining the capability, the system can comprise facilitating a utilization of the capability via the second network slice.

According to yet another embodiment, described herein is a machine-readable medium that comprises instructions, that when executed by a system comprising a processor, can perform operations comprising receiving signal data representative of a signal from an unmanned aircraft via a first network slice associated with an authentication procedure. In response to receiving the signal data, the operations further comprise determining that the unmanned aircraft is associated with a subscriber account. In response to determining that a condition associated with the subscriber account has been satisfied, the operations further comprise instantiating a capability of the unmanned aircraft via a second network slice. Additionally, based on the capability, the operations can further comprise sending provisioning data to provision the unmanned aircraft to utilize the capability via the second network slice.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment (UE) can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, PDA, tablet, mobile terminals, smart phone, laptop mounted equipment (LME), USB dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment, thus providing connectivity between the UE and the wider cellular network. The UE 102 can send transmission type recommendation data to the network node 104. The transmission type recommendation data can include a recommendation to transmit data via a closed loop multiple input multiple output (MIMO) mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). As mentioned, while example embodiments might be described for 5G new radio (NR) systems, the embodiments can be applicable to any radio access technology, a sample listing of which can be found, supra. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks fulfill the demand of exponentially increasing data traffic and allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of the spectral efficiency of LTE systems), high capacity that allows more device connectivity both concurrently and instantaneously, lower battery/power consumption (which reduces energy and consumption costs), better connectivity regardless of the geographic region in which a user is located, larger numbers of devices, lower infrastructural development costs, and higher reliability of the communications.

The 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are being adopted for use in 5G systems.

Figure 2:
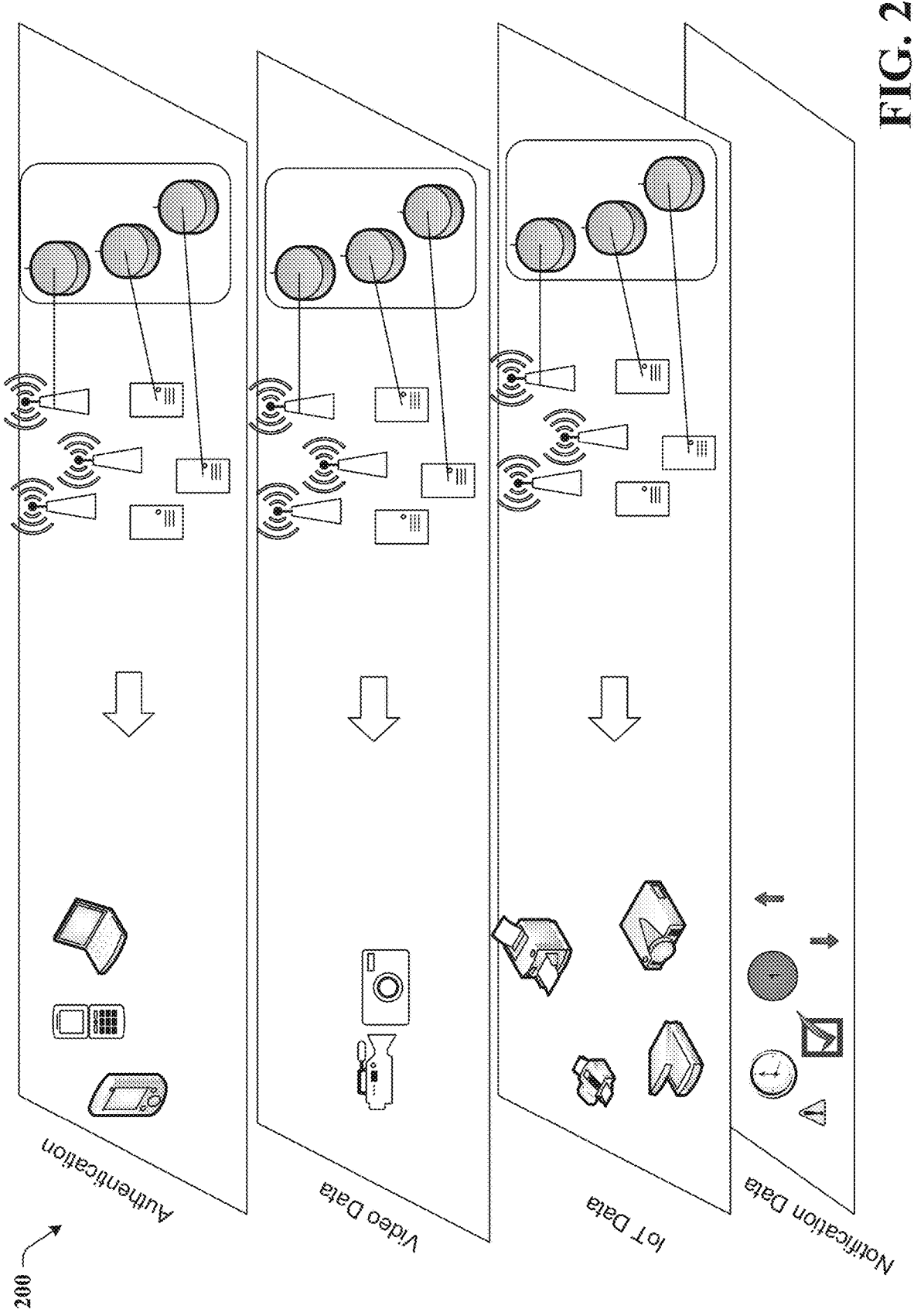
FIG. 2 illustrates an example schematic system block diagram of network slices according to one or more embodiments.

Referring now to FIG. 2, illustrated is an example schematic system block diagram of network slices 200 according to one or more embodiments.

Network slicing can enable UASs to receive different levels of connectivity from their service provider to accommodate use cases. To achieve the network slicing, the specifications provided can be based on a central cloud that is connected via a backhaul network to many edge computing clouds that are kilometers away from the UAS and move many services from the core to the edge. For example, as depicted, the network slices 200 can comprise a slice dedicated to UAS authentication, video services, IoTs, and/or alerts to $3^{rd}$ party UEs.

Figure 3:
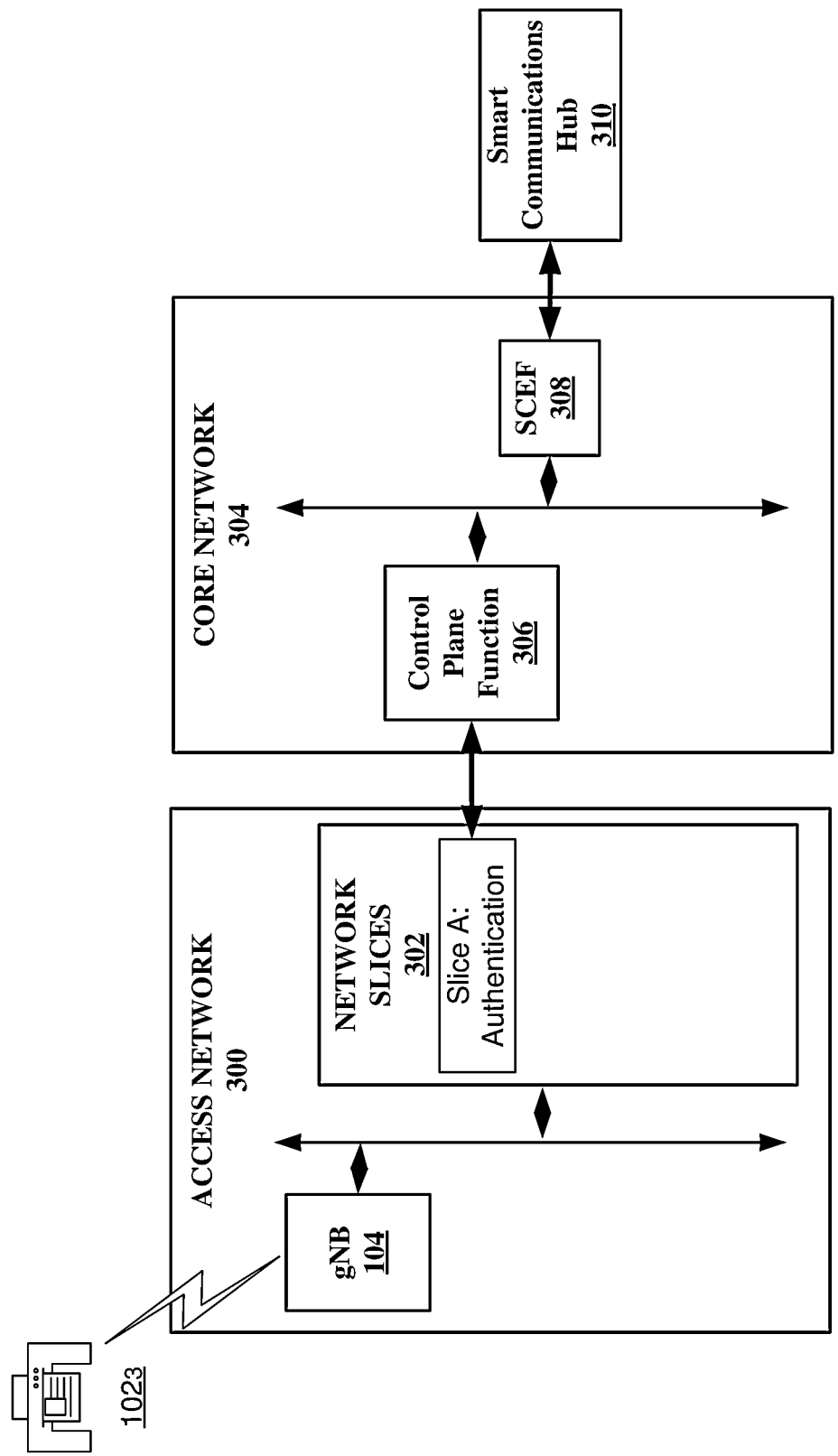
FIG. 3 illustrates an example schematic system block diagram of an unmanned aircraft communications system according to one or more embodiments.

Referring now to FIG. 3, illustrated is an example schematic system block diagram of an unmanned aircraft communications system according to one or more embodiments.

A UAS $102_3$ can be authenticated by a network slice of an access network 300 that can interact with a 5G control plane function 306 of a core network 304. For example, the UAS $102_3$ can send remote identification data to the gNB 104. Per the federal aviation administration, every UAS broadcasts a signal that includes a UAS ID (e.g., license plate) and operator location. Based on the UAS ID and/or the location of the UAS $102_3$, the UAS $102_3$ can be authenticated by an authentication slice based on established policies that can be set up and hosted by the control plane function 306. In addition to the polices, the control plane function 306 can manage and control the UAS $102_3$. For example, one policy may state that the UAS $102_3$ must have a subscription in order to access services that are found on various network slices. After the control plane function 306 has applied the relevant policies to the UAS $102_3$ based on the UAS $102_3$ identification data, the control plane function 306 can communicate with a SCEF 308. Thus, applications or service capabilities for the UAS $102_3$ such as video streaming, IoT capabilities, alerts to law enforcement or smart cities or other entities such as airports would be allowed only after the UAS $102_3$ authenticates and is registered on a smart communications hub 310 for unmanned vehicles. The smart communications hub 310 can communicate with the SCEF to determine which services are allowed for the UAS $102_3$ per the policies found at the control plane function 306.

Figure 4:
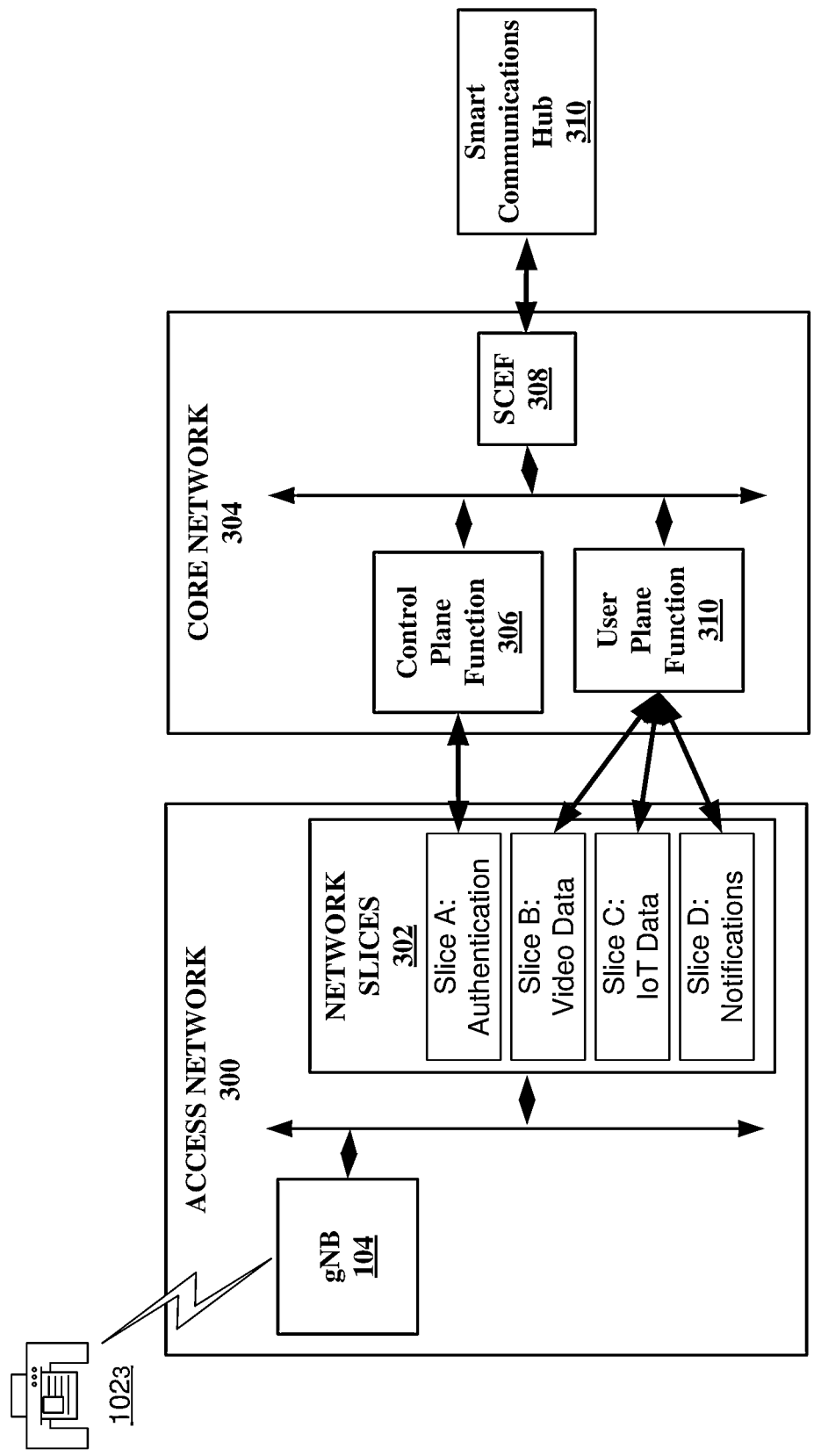
FIG. 4 illustrates an example schematic system block diagram of an unmanned aircraft communications system according to one or more embodiments.

Referring now to FIG. 4, illustrated is an example schematic system block diagram of an unmanned aircraft communications system according to one or more embodiments.

Once identification/authentication is successful, then other slices can be established for user plane data flow via the user plane function 312. For example, a network slice B can support video data after the authentication procedure facilitated by slice A. The network slice B can provide the UAS $102_3$ with video support resource optimization for bandwidth, streaming, bitrate, frame rate, or the like. For example, videos/pictures perceived by a camera of the UAS $102_3$ can be streamed to a data store and/or be shared with other entities (e.g., law enforcement, utility companies, etc.) and/or UEs $102_1$ of those entities. Another slice, slice C, can provide IoT data capabilities after authentication. The IoT data capabilities can allow the UAS $102_3$ to communicate with IoT devices of the UAS $102_3$ and/or acquire data (e.g., location, functionality, capabilities, operability, etc.) from separate IoT devices. This data can also be sent to a data store and/or shared with other UEs $102_1$ of the entities. Additionally, a slice D can allow the UAS $102_3$ to send notification data to the UEs $102_1$ of those entities or other service providers such the national airspace system (NAS), law enforcement, smart cities, insurance companies or any such needed entity. It is noted that the aforementioned listing of slices is not exhaustive, and any number of slices can be utilized. Additionally, the letters (A, B, C, D) associated with each slice are for example purposes, e.g., and used to distinguish one slice from others. What is shown is that the ability to access the various other slices hinges on the UAS $102_3$ being determined to have been authenticated, wherein the authentication process is further based on polices that are applied to the authentication procedure by the SCEF's 308 communication with the smart communications hub 310.

Once the UAS $102_3$ is authenticated, network slices can be instantiated based on a request, by the UAS $102_3$, for a resource that is associated with that slice. For example, after the UAS $102_3$ has been authenticated, the UAS $102_3$ can receive an indication that an event is occurring and can therefore utilize its video camera to capture the event. If video streaming is a service that has previously been subscribed to for the UAS $102_3$, then the video stream slice can be instantiated. This process can cause data from the smart communications hub 310 to be sent to the SCEF 308 prior to the data being sent to a user plane function 312 that can instantiate slice B for the UAS $102_3$. Once slice B has been instantiated, the access network 300 can provide the video streaming resource to the UAS $102_3$ via the gNB 104. Alternatively, in some scenarios, the UAS $102_3$ may not have subscribed to the video streaming service prior to receiving the indication that the UAS $102_3$ can utilize its video camera to capture the event. In this scenario, a prompt can be sent, by the access network 300, to an entity (or a UE 102 of that entity) associated with the UAS $102_3$, prompting the entity to subscribe to the service. If the entity subscribes to the service, then the instantiation flow can proceed as previously discussed. However, the authentication step can be skipped if the UAS $102_3$ has already been authenticated.

Figure 5:
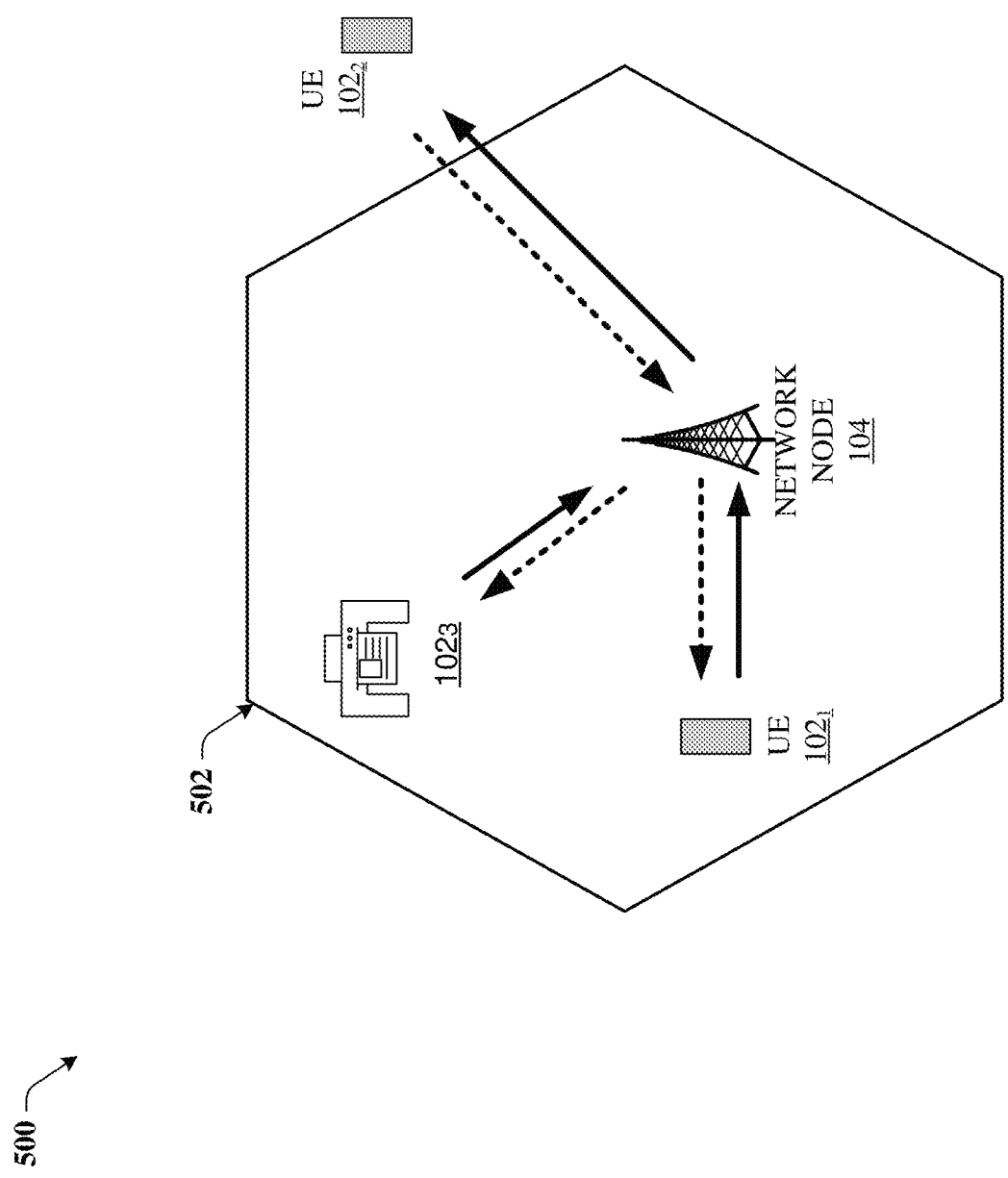
FIG. 5 illustrates an example schematic system block diagram of an unmanned aircraft communications system applying geographical constraints according to one or more embodiments.

Referring now to FIG. 5, illustrated is an example schematic system block diagram of an unmanned aircraft communications system applying geographical constraints according to one or more embodiments.

In one or more embodiments, communication from the UAS $102_3$ can be sent to a $3^{rd}$ party device (e.g., UE $102_1$) based on a location of the UAS $102_3$. For example, as illustrated in FIG. 5, communication from the UAS $102_3$ may only be sent to UE $102_1$ based on a determination that the UAS $102_3$ and the UE $102_1$ are in the same zone 502. However, it is noted that the communication hierarchy can be based on the policies hosted at the SCEF 308. For example, the policy can dictate that the UAS $102_3$ send its communication data to UE $102_2$, which is outside of the zone that the UAS $102_3$ is currently occupying and/or has previously been determined to have occupied. Therefore, if the policy dictates, streaming data from the UAS $102_3$ based on the slice B video data resource would be sent to UE $102_2$ instead of UE $102_1$.

Figure 6:
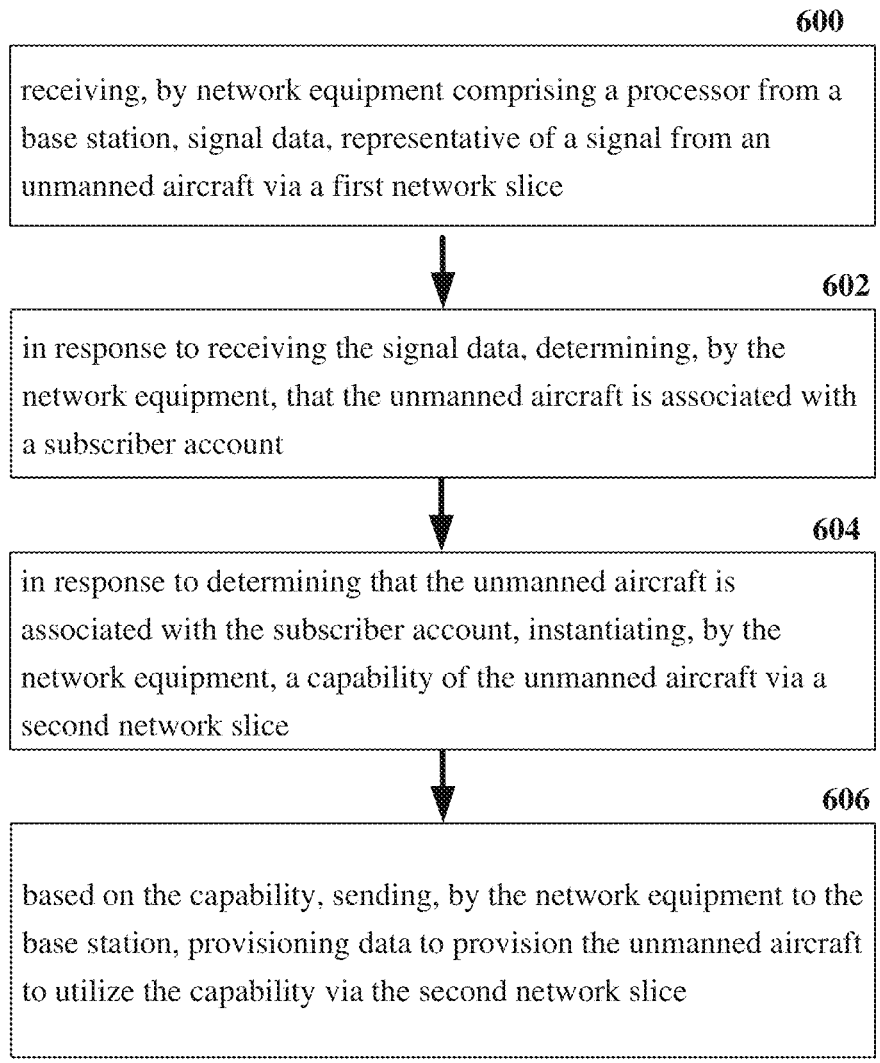
FIG. 6 illustrates an example flow diagram for a method for unmanned aircraft communications according to one or more embodiments.

Referring now to FIG. 6, illustrated is an example flow diagram for a method for unmanned aircraft communications according to one or more embodiments.

At element 600, the method can comprise receiving, by network equipment comprising a processor from a base station, signal data, representative of a signal from an unmanned aircraft via a first network slice. In response to receiving the signal data, at element 602, the method can comprise determining, by the network equipment, that the unmanned aircraft is associated with a subscriber account. In response to determining that the unmanned aircraft is associated with the subscriber account, at element 604, the method can comprise instantiating, by the network equipment, a capability of the unmanned aircraft via a second network slice. Furthermore, based on the capability, at element 606, the method can comprise sending, by the network equipment to the base station, provisioning data to provision the unmanned aircraft to utilize the capability via the second network slice.

Figure 7:
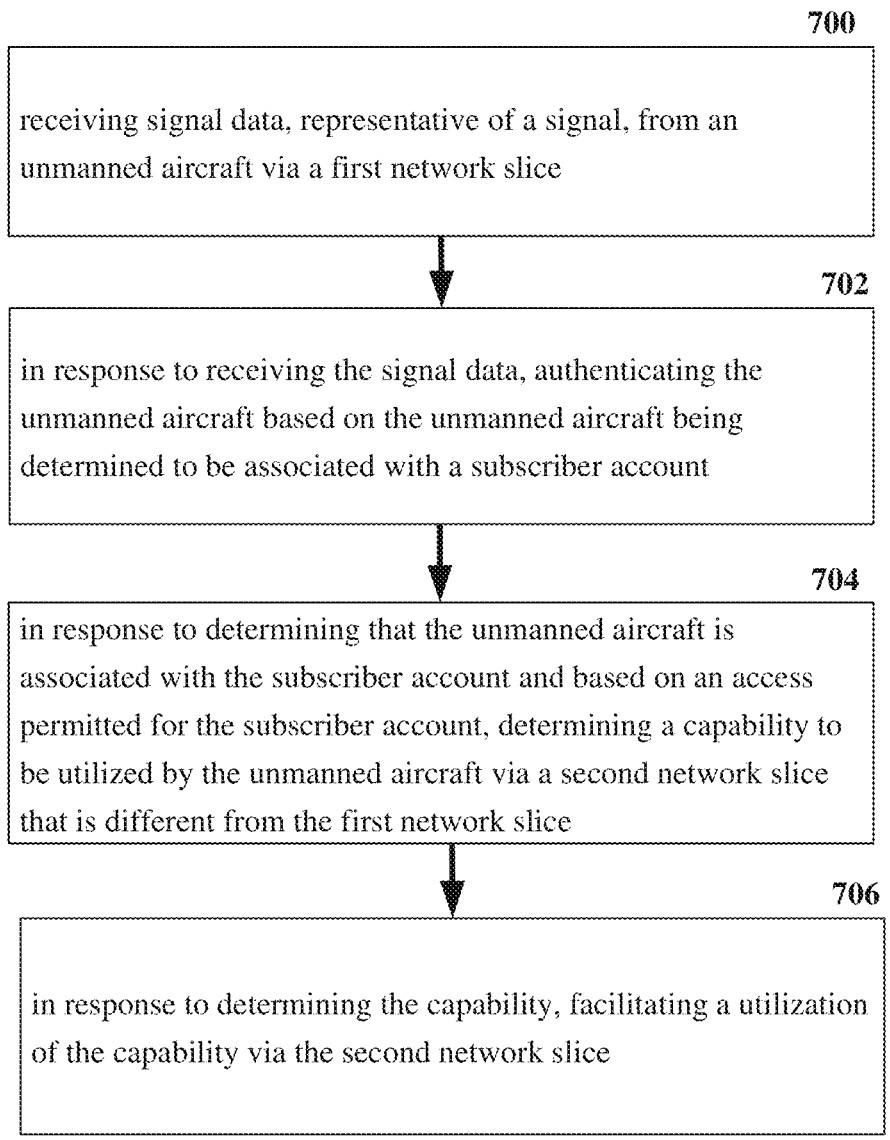
FIG. 7 illustrates an example flow diagram for a system for unmanned aircraft communications according to one or more embodiments.

Referring now to FIG. 7, illustrated is an example flow diagram for a system for unmanned aircraft communications according to one or more embodiments.

At element 700, the system can facilitate, receiving signal data, representative of a signal, from an unmanned aircraft via a first network slice. In response to receiving the signal data, at element 702, the system can comprise authenticating the unmanned aircraft based on the unmanned aircraft being determined to be associated with a subscriber account. Furthermore, in response to determining that the unmanned aircraft is associated with the subscriber account and based on an access permitted for the subscriber account, at element 704, the system can comprise determining a capability to be utilized by the unmanned aircraft via a second network slice that is different from the first network slice. Additionally, at element 706, in response to determining the capability, the system can comprise facilitating a utilization of the capability via the second network slice.

Figure 8:
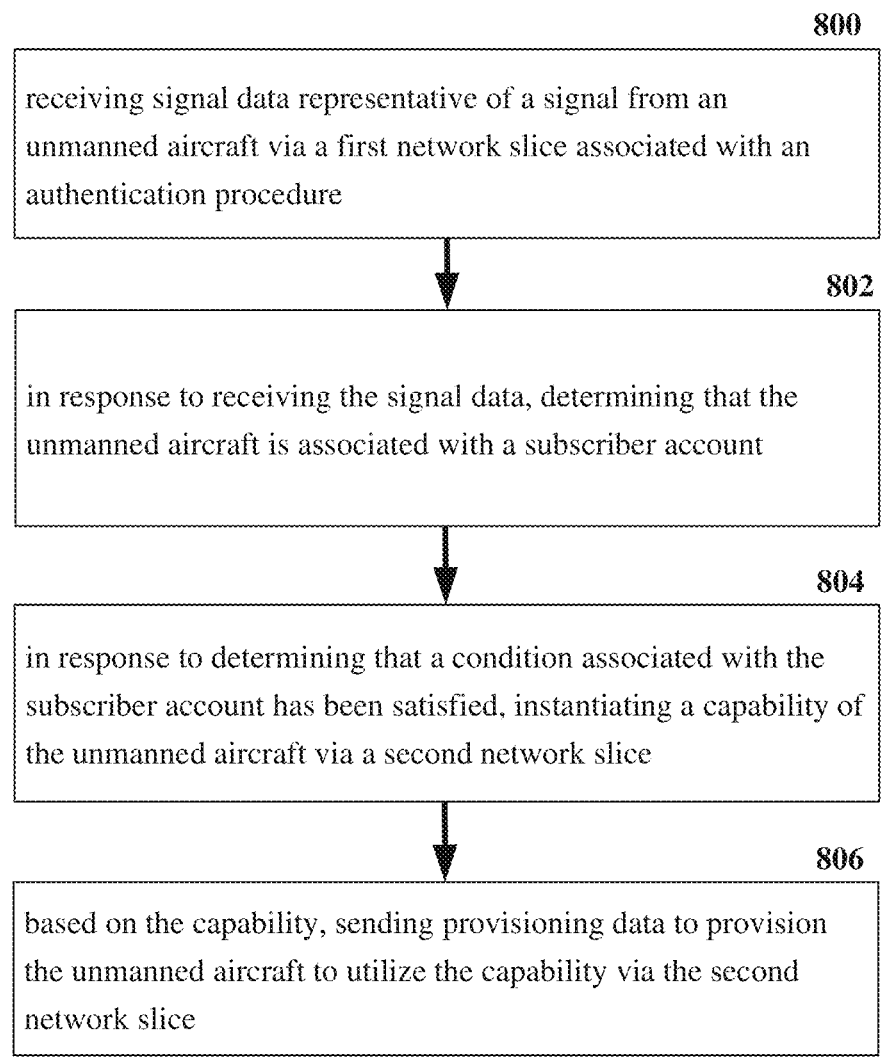
FIG. 8 illustrates an example flow diagram for a machine-readable medium unmanned aircraft communications according to one or more embodiments.

Referring now to FIG. 8, illustrated is an example flow diagram for a machine-readable medium, e.g., a non-transitory machine-readable medium, associated with unmanned aircraft communications according to one or more embodiments.

As illustrated, a non-transitory machine-readable medium can comprise executable instructions that, when executed by a processor, facilitate performance of operations. The operations comprise, at element 800, receiving signal data representative of a signal from an unmanned aircraft via a first network slice associated with an authentication procedure. The operations can further comprise, at element 802, in response to receiving the signal data, determining that the unmanned aircraft is associated with a subscriber account. The operations can further comprise, at element 804, in response to determining that a condition associated with the subscriber account has been satisfied, instantiating a capability of the unmanned aircraft via a second network slice. Furthermore, the operations can further comprise, at element 806, based on the capability, sending provisioning data to provision the unmanned aircraft to utilize the capability via the second network slice.

Figure 9:
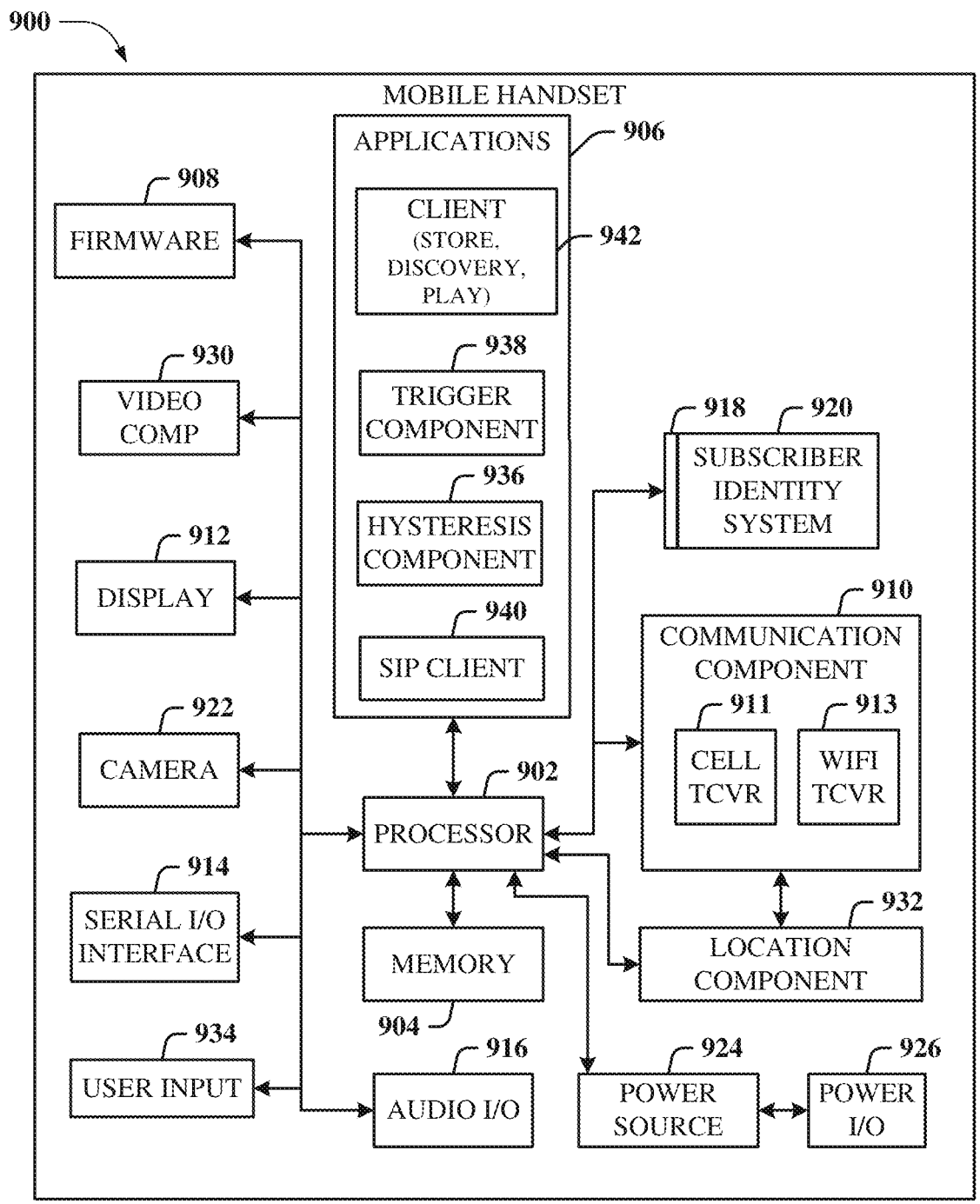
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary user equipment, such as a mobile handset 900, capable of connecting to a network in accordance with some embodiments described herein. (As one example, mobile handset 900 can be UE 102 in FIG. 1). Although a mobile handset 900 is illustrated herein, it will be understood that other mobile devices are contemplated herein and that the mobile handset 900 is merely illustrated to provide context for the embodiments of the various embodiments described herein. The following discussion is intended to provide a brief, general description of an example of a suitable environment, such as mobile handset 900, in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

The mobile handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, voice over internet protocol (VoIP) networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The mobile handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an alternating current (AC) power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The mobile handset 900, as indicated above related to the communications component 910, includes an indoor network radio transceiver 913 (e.g., Wi-Fi transceiver). This function supports the indoor radio link, such as IEEE 802.11, for the mobile handset 900, e.g., a dual-mode GSM handset. The mobile handset 900 can accommodate at least satellite radio services through a handset that can combine wireless voice and digital radio chipsets into a single handheld device.

Figure 10:
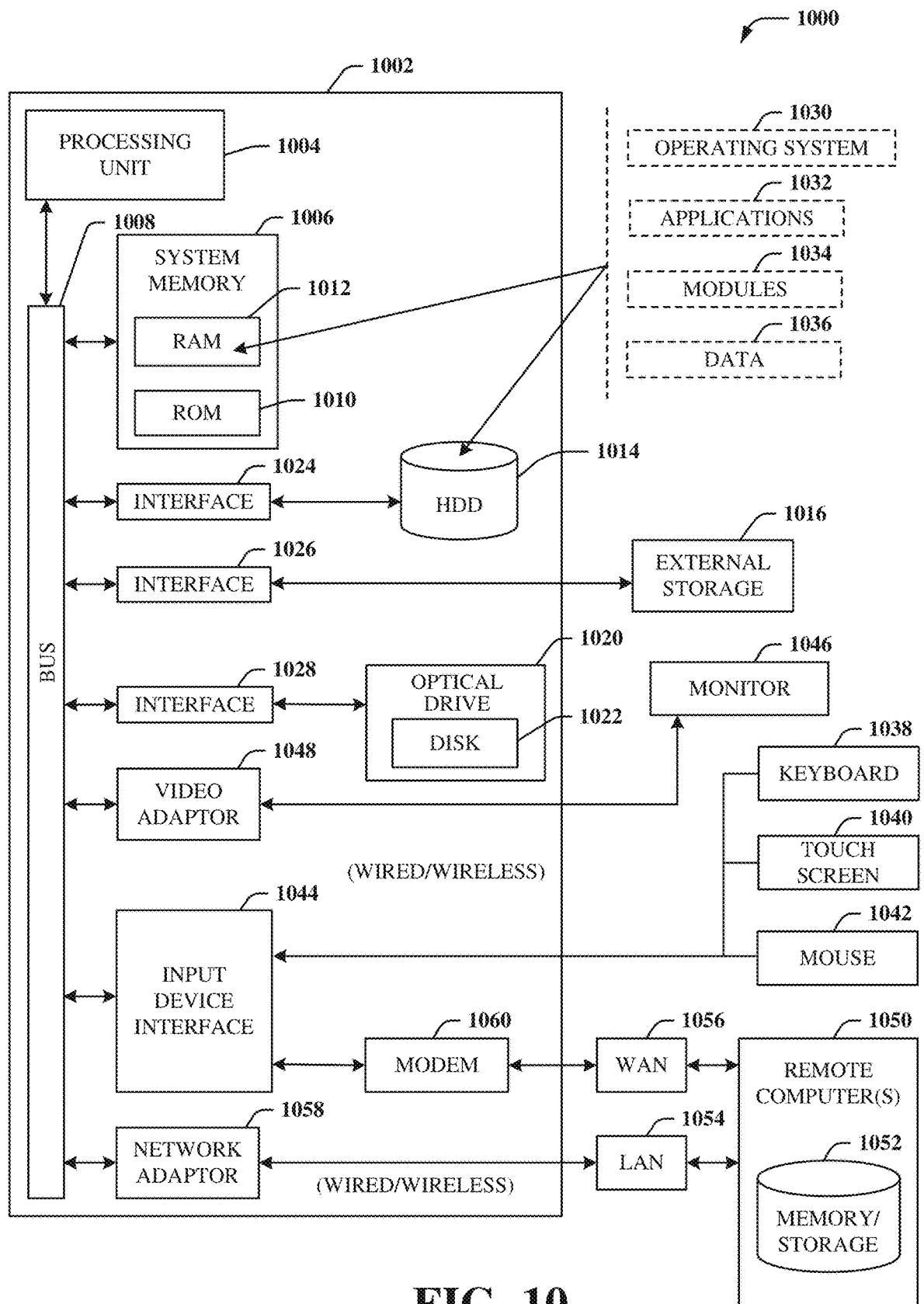
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of USB and IEEE 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, an RF remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wi-Fi and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment comprising a processor from a base station, signal data representative of a signal from an unmanned aircraft via a first network slice;
   in response to receiving the signal data, determining, by the network equipment, that the unmanned aircraft is associated with a subscriber account;
   in response to determining that the unmanned aircraft is associated with the subscriber account, instantiating, by the network equipment, a capability of the unmanned aircraft via a second network slice; and
   based on the capability, sending, by the network equipment to the base station, provisioning data to provision the unmanned aircraft to utilize the capability via the second network slice.

2. The method of claim 1, wherein determining that the unmanned aircraft is associated with the subscriber account comprises utilizing an authentication procedure.

3. The method of claim 2, wherein the first network slice is dedicated to the authentication procedure.

4. The method of claim 1, wherein the capability is a first capability, and further comprising:
   in response to determining that the unmanned aircraft is associated with the subscriber account, generating, by the network equipment, suggestion data representative of a suggestion to utilize a second capability different than the first capability.

5. The method of claim 4, further comprising:
   in response to generating the suggestion data, sending, by the network equipment, the suggestion data to a user device.

6. The method of claim 5, wherein the user device is associated with the subscriber account.

7. The method of claim 1, wherein the capability comprises an ability to send a notification to a device associated with a law enforcement entity.

8. A system, comprising:
   a processor; and
   a memory that stores executable instructions that, when executed by the processor, facilitate performance of operations, comprising:
      receiving signal data, representative of a signal, from an unmanned aircraft via a first network slice;
      in response to receiving the signal data, authenticating the unmanned aircraft based on the unmanned aircraft being determined to be associated with a subscriber account;
      in response to determining that the unmanned aircraft is associated with the subscriber account and based on an access permitted for the subscriber account, determining a capability to be utilized by the unmanned aircraft via a second network slice that is different from the first network slice; and
      in response to determining the capability, facilitating a utilization of the capability via the second network slice.

9. The system of claim 8, wherein the capability is a video capability.

10. The system of claim 8, wherein the capability is a first capability, and wherein the operations further comprise:
    in response to authenticating the unmanned aircraft, determining a second capability to be utilized by the unmanned aircraft.

11. The system of claim 10, wherein the unmanned aircraft does not have permission to utilize the second capability.

12. The system of claim 11, wherein the operations further comprise:
    sending request data, representative of a request to utilize the second capability, to a user equipment.

13. The system of claim 12, wherein the operations further comprise:
    in response to sending the request data, receiving confirmation data representative of a confirmation to utilize the second capability.

14. The system of claim 13, wherein the operations further comprise:
    in response to receiving the confirmation data, facilitating a utilization of the second capability via a third network slice that is different than the first network slice and the second network slice.

15. A non-transitory machine-readable medium, comprising executable instructions that, when executed by a processor, facilitate performance of operations, comprising:
    receiving signal data representative of a signal from an unmanned aircraft via a first network slice associated with an authentication procedure;

in response to receiving the signal data, determining that the unmanned aircraft is associated with a subscriber account;

in response to determining that a condition associated with the subscriber account has been satisfied, instantiating a capability of the unmanned aircraft via a second network slice; and based on the capability, sending provisioning data to provision the unmanned aircraft to utilize the capability via the second network slice.

16. The non-transitory machine-readable medium of claim 15, wherein the capability is a first, wherein the condition is a first condition, and wherein the operations further comprise:

in response to determining that a second condition associated with the subscriber account has not been satisfied, sending capability subscription data, representative of a prompt to subscribe to a second capability, to prompt a user equipment associated with the subscriber account.

17. The non-transitory machine-readable medium of claim 16, wherein the second capability comprises an ability to receive data from an internet-of-things device.

18. The non-transitory machine-readable medium of claim 16, wherein the operations further comprise:

in response to sending the capability subscription data, receiving, from a user equipment, subscription data representative of an intent to subscribe to the second capability.

19. The non-transitory machine-readable medium of claim 18, wherein the operations further comprise:

in response to receiving the subscription data, instantiating the second capability to receive data from an internet-of-things device via a third network slice.

20. The non-transitory machine-readable medium of claim 19, wherein the operations further comprise:

in response to instantiating the second capability to receive data from the internet-of-things device, receiving data from the internet-of-things device.

* * * * *